United States Patent
Chen et al.

(10) Patent No.: US 11,637,674 B2
(45) Date of Patent: Apr. 25, 2023

(54) INFORMATION TRANSMISSION METHOD, NETWORK DEVICE AND TERMINAL

(71) Applicant: VIVO MOBILE COMMUNICATION CO., LTD., Chang'an Dongguan (CN)

(72) Inventors: Xiaohang Chen, Chang'an Dongguan (CN); Peng Sun, Chang'an Dongguan (CN); Zhi Lu, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 212 days.

(21) Appl. No.: 17/121,031

(22) Filed: Dec. 14, 2020

(65) Prior Publication Data

US 2021/0099266 A1   Apr. 1, 2021

Related U.S. Application Data

(63) Continuation of application No. PCT/CN2019/094517, filed on Jul. 3, 2019.

(30) Foreign Application Priority Data

Jul. 6, 2018   (CN) .......................... 201810739059.0

(51) Int. Cl.
*H04L 5/00* (2006.01)
*H04W 72/04* (2023.01)
(Continued)

(52) U.S. Cl.
CPC ......... *H04L 5/0051* (2013.01); *H04W 72/044* (2013.01); *H04W 72/23* (2023.01)

(58) Field of Classification Search
CPC .............. H04W 72/042; H04W 72/044; H04L 5/0051; H04L 5/0094; H04L 5/001; H04L 5/0048
See application file for complete search history.

(56) References Cited

U.S. PATENT DOCUMENTS

| 2011/0110357 A1* | 5/2011 | Chung .................. H04L 5/0048 |
| | | 370/344 |
| 2012/0115470 A1* | 5/2012 | Zhuang ................. H04L 25/022 |
| | | 455/434 |

(Continued)

FOREIGN PATENT DOCUMENTS

| CN | 102404854 A | 4/2012 |
| CN | 107734656 A | 2/2018 |

(Continued)

OTHER PUBLICATIONS

Extended European Search Report related to Application No. 19830447.9; dated Jul. 1, 2021.

(Continued)

*Primary Examiner* — Pankaj Kumar
*Assistant Examiner* — Kenneth P Hunt
(74) *Attorney, Agent, or Firm* — von Briesen & Roper, s.c.

(57) ABSTRACT

The present disclosure provides an information transmission method, a network device and a terminal. The information transmission method includes: receiving an uplink signal, the uplink signal including a target DMRS; and determining uplink data for a terminal in accordance with the target (Continued)

```
┌──────────────────────────────────────────┐
│                                          │  ─ 51
│   receiving at least two DMRS identities │
│                                          │
└──────────────────────────────────────────┘
                      │
                      ▼
┌──────────────────────────────────────────┐
│       transmitting uplink data on        │  ─ 52
│   an MA resource using a target DMRS     │
└──────────────────────────────────────────┘
```

DMRS in the uplink signal. The terminal corresponds to at least two DMRS identities, and the target DMRS is one of DMRSs indicated by the at least two DMRS identities.

20 Claims, 5 Drawing Sheets

(51) Int. Cl.
  *H04W 72/044* (2023.01)
  *H04W 72/23* (2023.01)

(56) References Cited

U.S. PATENT DOCUMENTS

| | | | | |
|---|---|---|---|---|
| 2012/0129551 | A1* | 5/2012 | Islam | G01S 5/0268 455/456.1 |
| 2012/0270591 | A1* | 10/2012 | Sun | H04W 52/325 455/522 |
| 2017/0265092 | A1* | 9/2017 | Liu | H04W 24/02 |
| 2019/0173647 | A1* | 6/2019 | Xu | H04W 72/0413 |
| 2019/0174472 | A1* | 6/2019 | Lee | H04L 1/1812 |
| 2020/0146026 | A1* | 5/2020 | Shimezawa | H04W 72/02 |
| 2020/0196332 | A1* | 6/2020 | Yokomakura | H04L 5/0048 |
| 2020/0336256 | A1 | 10/2020 | Chen et al. | |
| 2020/0396047 | A1* | 12/2020 | Gao | H04L 5/0051 |

FOREIGN PATENT DOCUMENTS

| | | |
|---|---|---|
| CN | 108112080 A | 6/2018 |
| EP | 3780458 A1 | 2/2021 |

OTHER PUBLICATIONS

NTT DOCOMO, Inc., "Considerations on NOMA related procedures", May 21-25, 2018, 3GPP TSG RAN WG1 Meeting #93, Busan, Korea, R1-1807075.
International Search Report & Written Opinion related to Application No. PCT/CN2019/094517; dated Jan. 21, 2021.
Samsung, "Issues on PT-RS Design", May 21-25, 2018, 3GPP TSG RAN WG1 Meeting #93, Busan, Korea.
Japanese Reasons for Refusal Office Actions related to JP Application No. 2021-500141 dated Feb. 18, 2022.
R1-1800024, Source: Huawei, HiSilicon, "Discussion on LLS parameters and methodology for NoMA evaluation" Document for: Discussion/Decision, Agenda Item: 7.9, Release: 3GPP TSG RAN WG1 NR Adhoc Meeting, Jan. 22-26, 2018, Vancouver, Canada.
3GPP TS 38.211 V15.2.0, Source: 3rd Generation Partnership Project, "Technical Specification Group Radio Access Network" Release: 15, Jun. 2018, Valbonne, France.

* cited by examiner

INFORMATION TRANSMISSION METHOD, NETWORK DEVICE AND TERMINAL

CROSS-REFERENCE TO RELATED APPLICATION

The present application is a continuation of PCT Application No. PCT/CN2019/094517 filed on Jul. 3, 2019, which claims a priority of the Chinese patent application No. 201810739059.0 filed in China on Jul. 6, 2018, which is incorporated herein by reference in its entirety.

TECHNICAL FIELD

The present disclosure relates to the field of communications technology, in particular to an information transmission method, a network device and a terminal.

BACKGROUND

5$^{th}$ generation (5$^{th}$-Generation, 5G) mobile communications system, also called as new radio (New Radio, NR), may be adapted to more diversified scenarios and service requirements. Principal scenarios thereof includes enhanced mobile broadband (Enhanced Mobile Broadband, eMBB), massive machine type of communications (massive Machine Type of Communications, mMTC) and ultra reliable & low latency communications (Ultra Reliable & low Latency Communications, URLLC), and the system is highly demanded in these scenarios in terms of high reliability, low latency, large broadband and wide coverage.

In order to improve capacity and resource utilization rate of the system, a plurality of terminals may perform transmission on a same resource in a non-orthogonal manner. In addition, the NR system also supports a configured grant uplink transmission mode, so as to shorten a signaling interaction process, thereby to reduce the power consumption of the terminal. During the non-orthogonal uplink transmission, a same transmission resource may be reused by different terminals. At this time, a network device needs to differentiate uplink signals from different terminals. For the data transmission, different multiple access (Multiple Access, MA) signatures may be adopted by different terminals. The MA signature includes, but not limited to, a de-modulation reference signal (De-Modulation Reference Signal, DMRS). When different DMRSs are configured for different terminals for the transmission, it is able to prevent the occurrence of data conflict between the terminals, but it is difficult to support a large quantity of terminals to perform the transmission simultaneously.

SUMMARY

In a first aspect, the present disclosure provides in some embodiments an information transmission method for a network device side, including: receiving an uplink signal, the uplink signal including a target demodulation reference signal DMRS; and determining uplink data for a terminal in accordance with the target DMRS in the uplink signal. The terminal corresponds to at least two DMRS identities, and the target DMRS is one of DMRSs indicated by the at least two DMRS identities.

In a second aspect, the present disclosure provides in some embodiments a network device, including: a first reception module configured to receive an uplink signal, the uplink signal including a target demodulation reference signal DMRS; and a processing module configured to determine uplink data for a terminal in accordance with the target DMRS in the uplink signal. The terminal corresponds to at least two DMRS identities, and the target DMRS is one of DMRSs indicated by the at least two DMRS identities.

In a third aspect, the present disclosure provides in some embodiments a network device, including a processor, a memory, and a computer program stored in the memory and executed by the processor. The processor is configured to execute the computer program so as to implement the above-mentioned information transmission method.

In a fourth aspect, the present disclosure provides in some embodiments an information transmission method for a terminal side, including: receiving at least two demodulation reference signal DMRS identities; and transmitting uplink data on an MA resource using a target DMRS, the target DMRS being one of DMRSs indicated by the at least two DMRS identities.

In a fifth aspect, the present disclosure provides in some embodiments a terminal, including: a second reception module configured to receive at least two demodulation reference signal DMRS identities; and a transmission module configured to transmit uplink data on a multiple access resource using a target DMRS, the target DMRS being one of DMRSs indicated by the at least two DMRS identities.

In a sixth aspect, the present disclosure provides in some embodiments a terminal, including a processor, a memory, and a computer program stored in the memory and executed by the processor. The processor is configured to execute the computer program so as to implement the above-mentioned information transmission method.

In a seventh aspect, the present disclosure provides in some embodiments an information transmission method for a terminal side, including: receiving at least two phase tracking reference signal PTRS configuration parameters; and selecting one of candidate PTRSs corresponding to the at least two PTRS configuration parameters for transmission.

In an eighth aspect, the present disclosure provides in some embodiments a terminal, including: a reception module configured to receive at least two phase tracking reference signal PTRS configuration parameters; and a selection module configured to select one of candidate PTRSs corresponding to the at least two PTRS configuration parameters for transmission.

In a ninth aspect, the present disclosure provides in some embodiments a terminal, including a processor, a memory, and a computer program stored in the memory and executed by the processor. The processor is configured to execute the computer program so as to implement the above-mentioned information transmission method.

In a tenth aspect, the present disclosure provides in some embodiments an information transmission method for a network device side, including configuring at least two phase tracking reference signal PTRS configuration parameters for a terminal.

In an eleventh aspect, the present disclosure provides in some embodiments a network device, including a configuration module configured to configure at least two phase tracking reference signal PTRS configuration parameters for a terminal.

In a twelfth aspect, the present disclosure provides in some embodiments a network device, including a processor, a memory, and a computer program stored in the memory and executed by the processor. The processor is configured to execute the computer program so as to implement the above-mentioned information transmission method.

In a thirteenth aspect, the present disclosure provides in some embodiments a computer-readable storage medium storing therein a computer program. The computer program is executed by a processor so as to implement the above-mentioned information transmission method for the terminal side or the network device side.

BRIEF DESCRIPTION OF THE DRAWINGS

In order to illustrate the technical solutions of the present disclosure in a clearer manner, the drawings desired for the present disclosure will be described hereinafter briefly. Obviously, the following drawings merely relate to some embodiments of the present disclosure, and based on these drawings, a person skilled in the art may obtain the other drawings without any creative effort.

DETAILED DESCRIPTION

Figure 1:
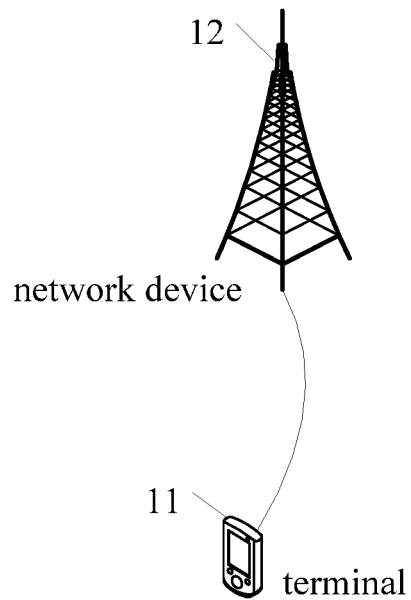
FIG. 1 is a block diagram of an applicable mobile communications system according to some embodiments of the present disclosure.

The present disclosure will be described hereinafter in conjunction with the drawings and embodiments. The following embodiments are for illustrative purposes only, but shall not be used to limit the scope of the present disclosure. Actually, the embodiments are provided so as to facilitate the understanding of the scope of the present disclosure.

Such words as "first" and "second" involved in the specification and the appended claims are merely used to differentiate different objects rather than to represent any specific order. It should be appreciated that, the data used in this way may be replaced with each other, so as to implement the embodiments in an order other than that shown in the drawings or described in the specification. In addition, such terms as "include" or "including" or any other variations involved in the present disclosure intend to provide non-exclusive coverage, so that a procedure, method, system, product or device including a series of steps or units may also include any other elements not listed herein, or may include any inherent steps or units of the procedure, method, system, product or device. The expression "and/or" involved in the embodiments of the present disclosure may represent at least one of listed items.

The technology described in the context shall not be limited to a long term evolution (Long Term Evolution, LTE)/LTE-advanced (LTE-Advanced, LTE-A) system, and it may also be applied to various wireless communication systems, e.g., code division multiple access (Code Division Multiple Access, CDMA), time division multiple access (Time Division Multiple Access, TDMA), frequency division multiple access (Frequency Division Multiple Access, FDMA), orthogonal frequency division multiple access (Orthogonal Frequency Division Multiple Access, OFDMA), single-carrier frequency-division multiple access (Single-Carrier Frequency-Division Multiple Access, SC-FDMA), or any other system. The terms "system" and "network" may be replaced with each other. The CDMA system may be used to implement such radio technologies as CDMA2000 and universal terrestrial radio access (Universal Terrestrial Radio Access, UTRA). The UTRA may include wideband code division multiple access (Wideband Code Division Multiple Access, WCDMA) and the other CDMA variants. The TDMA system may be used to implement such a radio technology as global system for mobile communications (Global System for Mobile Communications, GSM). The OFDMA system may be used to implement such radio technologies as ultra mobile broadband (Ultra Mobile Broadband, UMB), evolved-UTRA (Evolved-UTRA, E-UTRA), IEEE 802.11 (wireless fidelity (Wireless Fidelity, Wi-Fi)), IEEE 802.16 (WiMAX), IEEE 802.20, and Flash-OFDM. The UTRA and the E-UTRA are parts of a universal mobile telecommunications system (Universal Mobile Telecommunications System, UMTS). The LTE and a more advanced LTE (e.g., LTE-A) are new UMTS versions using the E-UTRA. The UTRA, E-UTRA, UMTS, LTE, LTE-A and GSM have been described in literatures from the $3^{rd}$-generation partnership project 2 ($3^{rd}$-Generation Partnership Project 2, 3GPP2). The technology described in the context may be applied to the above-mentioned systems and radio technologies, or applied to the other systems and radio technologies. However, an NR system has been described illustratively hereinafter, and terms for the NR system have been used in most of the description, although these technologies may also be applied to the systems other than the NR system.

The following description is given for illustrative purposes but shall not be construed as limiting the scope, applicability or configuration set forth in the appended claims. Any alterations may be made on functions and arrangements of the discussed elements without departing from the spirit and scope of the present disclosure. Various procedures or assemblies may be omitted, replaced or added appropriately in the examples. For example, steps of the described method may be performed in an order different from that described in the context, and some steps may be added, omitted or combined. In addition, the features described with reference to some examples may be combined in the other examples.

FIG. 1 is a block diagram of an applicable wireless communications system according to some embodiments of the present disclosure. The wireless communications system includes a terminal 11 and a network device 12. The terminal 11 may also be called as a terminal device or user equipment (User Equipment, UE), and it may be a terminal side device such as a mobile phone, a tablet personal computer, a laptop computer, a personal digital assistant (Personal Digital Assistant, PDA), a mobile internet device (Mobile Internet Device, MID), a wearable device or a vehicle-mounted device. It should be appreciated that, the specific type of the terminal 11 will not be particularly defined herein. The network device 12 may be a 5G base station or a future base station (e.g., gNB, or 5G NR NB), or a base station in the other communications system (e.g., eNB, wireless local area network (Wireless Local Area Network, WLAN) access point, or any other access point). The base station may be called as node B, evolved node B, access point, base transceiver station (Base Transceiver Station, BTS), radio base station, radio transceiver, basic service set (Basic Service Set, BSS), extended service set (Extended Service Set, ESS), home node B, evolved home node B, WLAN access point, WiFi node or any other appropriate term in the field. The base station shall not be limited to a specific technical term, as long as a same technical effect is achieved. It should be appreciated that, merely the base station in an NR system may be taken as an example in the embodiments of the present disclosure, but a specific type of the base station will not be particularly defined herein.

The base station may communicate with the terminal 11 under the control of a base station controller. In various examples, the base station controller may be a part of a core network or some base stations. Some base stations may exchange control information or user data with the core network through backhaul. In some examples, some of the base stations may directly or indirectly communicate with each other through a backhaul link, and the backhaul link may be a wired or wireless communications link. The wireless communications system may support operations on a plurality of carriers (waveform signals at different frequencies). A multi-carrier transmitter may transmit modulated signals on the plurality of carriers simultaneously. For example, each communications link may be a multi-carrier signal modulated using various radio technologies. Each modulated signal may be transmitted on different carriers and may carry control information (e.g., reference signal or control channel), overhead information, data, etc.

The base station may communicate with the terminal 11 in a wireless manner via one or more access point antennae. Each base station may provide communications coverage at a corresponding coverage region. A coverage region for an access point may be a sector merely constituting a part of the coverage region. The wireless communications system may include various base stations (e.g., macro base station, micro base station, or pico base station). The base station may also use different radio technologies, e.g., cellular or WLAN radio access technology. The base station may be associated with same or different access network or operator deployments. The coverage regions of different base stations (including the coverage regions of the base stations of a same type or different types, the coverage regions using same or different radio technologies, or the coverage regions belonging to same or different access networks) may overlap each other.

A communications link in the wireless communications system may include an uplink for carrying uplink (Uplink, UL) transmission (e.g., from the terminal 11 to the network device 12), or a downlink for carrying downlink (Downlink, DL) transmission (e.g., from the network device 12 to the terminal 11). The UL transmission may also be called as reverse link transmission, and the DL transmission may also be called as forward link transmission. The downlink transmission may be performed using a licensed frequency band, a non-licensed frequency band or both. Similarly, the uplink transmission may be performed using the licensed frequency band, the non-licensed frequency band or both.

Figure 2:
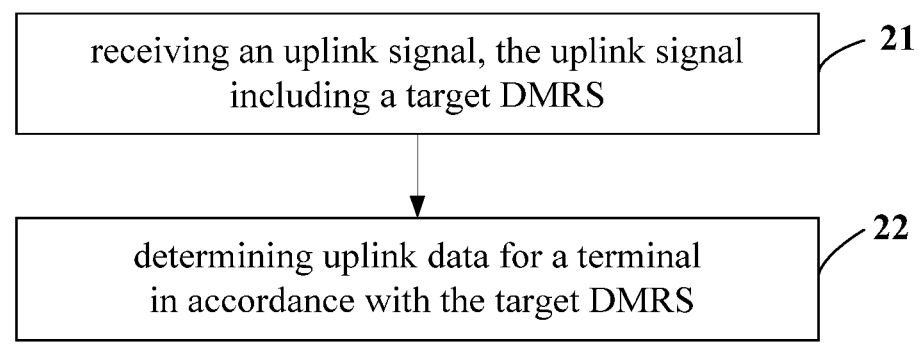
FIG. 2 is a flow chart of an information transmission method for a network device side according to some embodiments of the present disclosure.

The present disclosure provides in some embodiments an information transmission method for a network device side which, as shown in FIG. 2, includes the following steps.

Step 21: receiving an uplink signal, the uplink signal including a target DMRS.

Here, the uplink signal may refer to an uplink signal transmitted in a non-orthogonal manner. To be specific, this step may include receiving the uplink signal transmitted by a terminal in a non-orthogonal transmission mode. The uplink signal may be transmitted on an MA resource, and it may include a preamble and MA signature-based data, or include a preamble, a DMRS and MA signature-based data, or include a DMRS and MA signature-based data. The preamble may include a cyclic prefix, a preamble sequence and a guard period.

Step 22: determining uplink data for the terminal in accordance with the target DMRS.

The terminal may correspond to at least two DMRS identities, and the target DMRS may be one of DMRSs indicated by the at least two DMRS identities. Further, prior to Step 21, the method may further include configuring the at least two DMRS identities for the terminal. In other words, a network device may configure the at least two DMRS identities for one terminal, and during the non-orthogonal uplink transmission, the terminal may select one of the at least two DMRS identities, and perform the non-orthogonal uplink transmission using the DMRS indicated by the selected DMRS identity. It should be appreciated that, the DMRSs configured by the network device for different terminals may overlap each other. For example, the network device may configure DMRS1, DMRS2, DMRS3 and DMRS4 for a terminal 1, and configure DMRS2, DMRS3 and DMRS5 for another terminal. Through configuring at least two DMRS identities for one terminal, it is able for the terminal to select the DMRS more flexibly, increase the DMRS capacity, and reduce the probability of selecting a same DMRS by a plurality of terminals.

The DMRS identity may include a DMRS configuration parameter and/or DMRS scrambling information. The DMRS configuration parameters and the DMRS scrambling information will be described hereinafter.

The DMRS configuration parameters may include at least one of the followings.

Index of a DMRS configuration. The indexes of the DMRS configurations may be used to differentiate the DMRS configurations from each other. Here, the index of the DMRS configuration may be a DMRS index maintained by a system. For example, when a DMRS pool of the system includes DMRS indices 1 to M and a DMRS index 3 has been configured by the network device for the terminal, the index of the DMRS configuration may be just 3. Alternatively, the index of the DMRS configuration may be an index of a DMRS configured by the network device for the terminal. For example, when the DMRS pool of the system includes DMRS indices 1 to M and DMRS indices 3, 4 and 5 have been configured by the network device for the terminal, the indexes of the DMRS configurations may be just 1, 2 and 3.

DMRS Port Index.

DMRS time-domain position, e.g., a time-domain symbol where the DMRS is located.

Correspondence between DMRSs and preambles. Here, the correspondence may be indicated explicitly or implicitly. Taking the explicit indication as an example, a preamble sequence or a preamble index corresponding to the DMRS configuration may be directly indicated in the DMRS configuration parameter. Taking the implicit indication as an example, the preamble sequence or the preamble index corresponding to the DMRS configuration may be determined through a predefined association relation.

Correspondence between DMRSs and phase tracking reference signals (Phase Tracking Reference Signals, PTRSs). Similar to the modes for indicating the correspondence between the DMRSs and the preambles, the correspondence between the DMRSs and the PTRSs may also be indicated explicitly or implicitly. Taking the explicit indication as an example, a PTRS parameter or an index of a PTRS configuration parameter corresponding to the DMRS configuration may be directly indicated in the DMRS configuration parameter. Taking the implicit indication as an example, the PTRS parameter or the index of the PTRS configuration parameter corresponding to the DMRS configuration may be determined through a predefined association relation.

DMRS bandwidth. The DMRS bandwidth may be predefined or configured by the network device, and it may be greater than or equal to a bandwidth for the MA resource where the uplink data is located. Alternatively, when the DMRS bandwidth is predefined, it may be the same as the bandwidth for the MA resource by default, i.e., the DMRS bandwidth may be the same as a data bandwidth. When the DMRS bandwidth is configured by the network device, it may be greater than the bandwidth for the MA resource, so as to ensure the channel estimation performance when reused by a plurality of users, thereby to use a longer DMRS sequence and improve the DMRS orthogonality between different users.

DMRS transmission power. The DMRS transmission power may be the same power as an uplink data channel of the terminal on a same Resource Element (RE), i.e., the power of the DMRS may be the same as the power of the data on the same RE. To be specific, when the DMRS bandwidth is the same as a data transmission bandwidth, the power of the DMRS may be the same as the power of the data on the same RE. When the DMRS bandwidth is greater than the data transmission bandwidth, the DMRS transmission power may be the same as data transmission power, i.e., the power of the DMRS may be not the same as the power of the data on the same RE. Alternatively, the DMRS transmission power corresponding to each DMRS port may be configured separately. For example, the DMRS may use a power boosting mode, and the power boosting may be configured on the basis of each DMRS port. To be specific, when the DMRS bandwidth is the same as the data transmission bandwidth and the DMRS is not multiplexed with the data in a frequency-division manner on a same OFDM symbol, the DMRS may use the power boosting mode.

The description about the DMRS configuration parameter has been given hereinabove, and the DMRS scrambling information in the DMRS identity will be described hereinafter.

Figure 3:
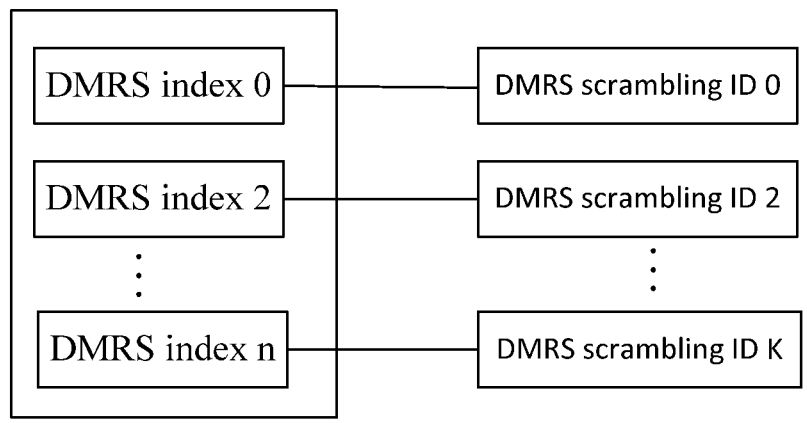
FIG. 3 is a schematic view showing a mapping between DMRSs and DMRS scrambling Identities (IDs) according to some embodiments of the present disclosure.

The DMRS scrambling information may include at least two DMRS scrambling identities (IDs) corresponding to the DMRSs. One DMRS identity may correspond to one DMRS, i.e., at least two DMRSs may be configured by the network device for the terminal, and the at least two DMRSs may correspond to at least two DMRS scrambling IDs respectively. FIG. 3 shows a correspondence between the DMRSs and the DMRS scrambling IDs, and one DMRS may correspond to one DMRS scrambling ID, e.g., DMRS index0 may correspond to DMRS scrambling ID0, DMRS index1 may correspond to DMRS scrambling ID1, . . . , and DMRS index n may correspond to DMRS scrambling ID n, where k=n mod L, n represents the quantity of DMRSs, and L represents the quantity of DMRS scrambling IDs. Alternatively, in the correspondence between the DMRSs and the DMRS scrambling IDs, one DMRS may correspond to at least two DMRS scrambling IDs, and the terminal may randomly select one of the at least two DMRS scrambling IDs to scramble the DMRS. In this regard, even the same DMRS is adopted by different terminals, signal collision may not occur due to the different DMRS scrambling IDs. It should be appreciated that, the network device may configure all DMRS scrambling IDs, as an optional set, for each DMRS, i.e., the DMRS scrambling IDs for DMRSs 0 to n may include the DMRS scrambling IDs 0 to k. In this scenario, it may also be understood as that there is no correspondence between the DMRSs and the DMRS scrambling IDs.

In some embodiments of the present disclosure, the target DMRS and the uplink data (the uplink data for the terminal) may be multiplexed in a time-division manner. It should be appreciated that, the DMRS may not be multiplexed with the uplink data in a frequency-division manner on one OFDM symbol. The target DMRS may correspond to the DMRS configuration parameter and/or the DMRS scrambling information. In other words, the DMRS corresponding to the DMRS configuration parameter may be multiplexed with the uplink data for the terminal in a time-division manner, the DMRS corresponding to the DMRS scrambling ID may be multiplexed with the uplink data for the terminal in a time-division manner, and the DMRS corresponding to the DMRS configuration parameter and the DMRS scrambling ID may be multiplexed with the uplink data for the terminal in a time-division manner.

Prior to Step 21, the method may further include configure the PTRS configuration parameter for the terminal. To be specific, the network device may configure at least two PTRSs for the terminal, and one PTRS configuration parameter may correspond to one DMRS ID.

To be specific, the PTRS configuration parameter may include at least one of the followings.

Index of a PTRS configuration. The indexes of the PTRS configurations may be used to differentiate the PTRS configurations from each other. Here, the index of the PTRS configuration may be a PTRS index maintained by the system. For example, when a PTRS pool of the system includes PTRS indices 1 to N and a PTRS index 3 has been configured by the network device for the terminal, the index of the PTRS configuration may be just 3. Alternatively, the index of the PTRS configuration may be an index of a PTRS configured by the network device for the terminal. For example, when the PTRS pool of the system includes PTRS indices 1 to N and PTRS indices 3, 4 and 5 have been configured by the network device for the terminal, the indexes of the PTRS configurations may be just 1, 2 and 3.

PTRS Port Index.

PTRS time/frequency-domain position, e.g., a time-domain symbol where the PTRS is located, or a subcarrier where the PTRS is located.

PTRS time/frequency-domain density, i.e., a time-domain density and/or a frequency-domain density of the PTRS.

Correspondence between PTRSs and preambles. Here, the correspondence may be indicated explicitly or implicitly. Taking the explicit indication as an example, a preamble sequence or a preamble index corresponding to the PTRS configuration may be directly indicated in the PTRS configuration parameter. Taking the implicit indication as an example, the preamble sequence or the preamble index corresponding to the PTRS configuration may be determined through a predefined association relation.

Correspondence between PTRSs and DMRSs. Similar to the modes for indicating the correspondence between the PTRSs and the preambles, the correspondence between the PTRSs and the DMRSs may also be indicated explicitly or implicitly. Taking the explicit indication as an example, an index of a DMRS configuration parameter corresponding to the PTRS configuration may be directly indicated in the PTRS configuration parameter. Taking the implicit indication as an example, the index of the DMRS configuration parameter corresponding to the PTRS configuration may be determined through a predefined association relation.

PTRS Transmission Power.

According to some embodiments of the present disclosure, the network device may configure at least two DMRS IDs for the terminal, and the terminal may select one of the at least two DMRS IDs. As a result, it is able to increase the quantity of DMRSs capable of being selected by the terminal, and increase the DMRS capacity to some extent, thereby to reduce the probability of a collision between reference signals transmitted in a non-orthogonal manner, and support a large quantity of terminals to perform the transmission simultaneously.

The information transmission method has been described hereinabove in details in different scenarios, and a corresponding network device will be described hereinafter in conjunction with the drawings.

Figure 4:
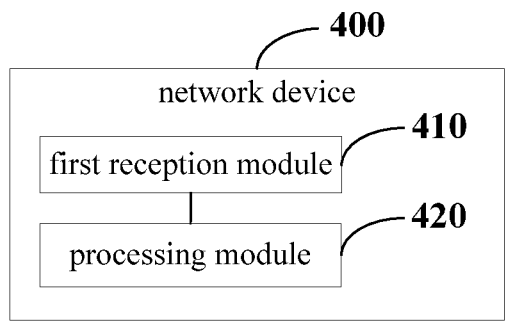
FIG. 4 is a schematic view showing a modular structure of a network device according to some embodiments of the present disclosure.

As shown in FIG. 4, the present disclosure further provides in some embodiments a network device 400 capable of implementing the above-mentioned method, i.e., receiving the uplink signal and determining the uplink data for the terminal in accordance with the target DMRS in the uplink signal, with a same technical effect. The terminal may correspond to at least two DMRS IDs, and the target DMRS may be one of DMRSs indicated by the at least two DMRS IDs. The network device 400 includes the following functional modules: a first reception module 410 configured to receive an uplink signal, the uplink signal including a target DMRS; and a processing module 420 configured to determine uplink data for a terminal in accordance with the target DMRS. The terminal may correspond to at least two DMRS identities, and the target DMRS may be one of DMRSs indicated by the at least two DMRS identities.

In a possible embodiment of the present disclosure, the network device 400 may further include a first configuration module configured to configure the at least two DMRS identities for the terminal.

In a possible embodiment of the present disclosure, the DMRS identity may include a DMRS configuration parameter and/or DMRS scrambling information.

In a possible embodiment of the present disclosure, the DMRS configuration parameter may include at least one of an index of a DMRS configuration, a DMRS port index, a DMRS time-domain position, a correspondence between DMRSs and preambles, a correspondence between DMRSs and PTRSs, a DMRS bandwidth and DMRS transmission power.

In a possible embodiment of the present disclosure, the DMRS bandwidth may be predefined or configured by the network device, and the DMRS bandwidth may be greater than or equal to a bandwidth for an MA resource where the uplink data is located.

In a possible embodiment of the present disclosure, the DMRS transmission power may be the same power as an uplink data channel of the terminal on a same RE, and/or the DMRS transmission power corresponding to each DMRS port may be configured separately.

In a possible embodiment of the present disclosure, the DMRS scrambling information may include at least two DMRS scrambling IDs corresponding to the DMRSs.

In a possible embodiment of the present disclosure, the target DMRS may be multiplexed with the uplink data in a time-division manner, and the target DMRS may correspond to the DMRS configuration parameter and/or the DMRS scrambling information.

In a possible embodiment of the present disclosure, the network device may further include a second configuration module configured to configure a PTRS configuration parameter for the terminal.

In a possible embodiment of the present disclosure, one PTRS configuration parameter may correspond to one DMRS identity.

In a possible embodiment of the present disclosure, the PTRS configuration parameter may include at least one of an index of a PTRS configuration, a PTRS port index, a PTRS time/frequency-domain position, a PTRS time/frequency-domain density, a correspondence between PTRSs and preambles, a correspondence between PTRSs and DMRSs, and PTRS transmission power.

It should be appreciated that, according to the embodiments of the present disclosure, the network device may configure at least two DMRS IDs for the terminal, and the terminal may select one of the at least two DMRS IDs. As a result, it is able to increase the quantity of DMRSs capable of being selected by the terminal, and increase the DMRS capacity to some extent, thereby to reduce the probability of a collision between reference signals transmitted in a non-orthogonal manner, and support a large quantity of terminals to perform the transmission simultaneously.

In order to achieve the above purpose in a better manner, the present disclosure further provides in some embodiments a network device, which includes a processor, a memory, and a computer program stored in the memory and executed by the processor. The processor is configured to execute the computer program so as to implement the steps of the above-mentioned information transmission method. The present disclosure further provides in some embodiments a computer-readable storage medium storing therein a computer program. The computer program is executed by a processor so as to implement the steps of the above-mentioned information transmission method.

The information transmission method has been described hereinabove from the network device side, and it will be further described hereinafter from a terminal side in conjunction with the drawings.

Figure 5:
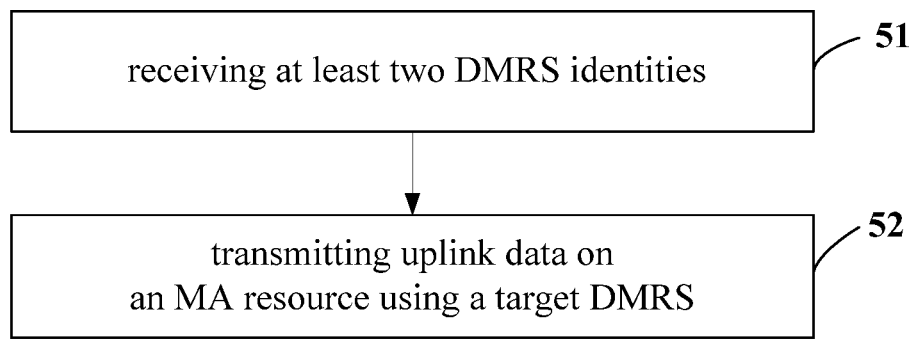
FIG. 5 is a schematic view showing an information transmission method for a terminal side according to some embodiments of the present disclosure.

The present disclosure further provides in some embodiments an information transmission method for a terminal side which, as shown in FIG. 5, includes the following steps.

Step 51: receiving at least two DMRS identities.

In other words, a network device may configure at least two DMRS identities for one terminal. It should be appreciated that, DMRSs configured by the network device for different terminals may overlap each other. For example, the network device may configure DMRS1, DMRS2, DMRS3 and DMRS4 for a terminal 1, and configure DMRS2, DMRS3 and DMRS5 for another terminal. Through configuring at least two DMRS identities for one terminal, it is able for the terminal to select the DMRS more flexibly, increase the DMRS capacity, and reduce the probability of selecting a same DMRS by a plurality of terminals.

Step 52: transmitting uplink data on an MA resource using a target DMRS.

In a possible embodiment of the present disclosure, the target DMRS may be one of DMRSs indicated by the at least two DMRS identities. In other words, during the non-orthogonal uplink transmission, the terminal may select one of the at least two DMRS identities, and perform the uplink non-orthogonal transmission using the DMRS indicated by the selected DMRS identity.

In a possible embodiment of the present disclosure, the DMRS identity may include a DMRS configuration parameter and/or DMRS scrambling information.

In a possible embodiment of the present disclosure, the DMRS configuration parameter may include at least one of an index of a DMRS configuration, a DMRS port index, a DMRS time-domain position, a correspondence between DMRSs and preambles, a correspondence between DMRSs and PTRSs, a DMRS bandwidth and DMRS transmission power.

In a possible embodiment of the present disclosure, the DMRS bandwidth may be predefined or configured by the network device, and the DMRS bandwidth may be greater than or equal to a bandwidth for the MA resource.

In a possible embodiment of the present disclosure, the DMRS transmission power may be the same power as an uplink data channel of the terminal on a same RE, and/or the DMRS transmission power corresponding to each DMRS port may be configured separately.

In a possible embodiment of the present disclosure, the DMRS scrambling information may include at least two DMRS scrambling IDs corresponding to the DMRSs.

In a possible embodiment of the present disclosure, the target DMRS may be multiplexed with the uplink data in a time-division manner, and the target DMRS may correspond to the DMRS configuration parameter and/or the DMRS scrambling information.

It should be appreciated that, the information transmission method at the terminal side may correspond to the above-mentioned information transmission method at the network device side, and various implementation modes at the network device side may be adaptively applied to the embodiments at the terminal side, e.g., the information accurately received by the terminal may be the same as the information transmitted by the network device, which will thus not be particularly defined herein.

According to some embodiments of the present disclosure, the terminal may select one of the at least two DMRS IDs configured by the network device for the non-orthogonal uplink transmission. As a result, it is able to increase the quantity of DMRSs capable of being selected by the terminal, and increase the DMRS capacity to some extent, thereby to reduce the probability of a collision between reference signals transmitted in a non-orthogonal manner, and support a large quantity of terminals to perform the transmission simultaneously.

The information transmission method in different scenarios has been described hereinabove, and the corresponding terminal will be further described hereinafter in conjunction with the drawings.

Figure 6:
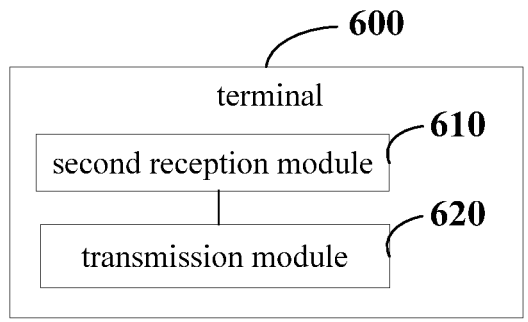
FIG. 6 is a schematic view showing a modular structure of a terminal according to some embodiments of the present disclosure.

As shown in FIG. 6, the present disclosure further provides in some embodiments a terminal 600 capable of implementing the above-mentioned method, i.e., receiving the at least two DMRS identities and transmitting the uplink data on the MA resource using the target DMRS, with a same technical effect. The terminal may correspond to at least two DMRS IDs, and the target DMRS may be one of DMRSs indicated by the at least two DMRS identities. The terminal 600 includes the following functional modules: a second reception module 610 configured to receive at least two DMRS identities; and a transmission module 620 configured to transmit uplink data on an MA resource using a target DMRS, the target DMRS being one of DMRSs indicated by the at least two DMRS identities.

In a possible embodiment of the present disclosure, the DMRS identity may include a DMRS configuration parameter and/or DMRS scrambling information.

In a possible embodiment of the present disclosure, the DMRS configuration parameter may include at least one of an index of a DMRS configuration, a DMRS port index, a DMRS time-domain position, a correspondence between DMRSs and preambles, a correspondence between DMRSs and PTRSs, a DMRS bandwidth and DMRS transmission power.

In a possible embodiment of the present disclosure, the DMRS bandwidth may be predefined or configured by the network device, and the DMRS bandwidth may be greater than or equal to a bandwidth for the MA resource.

In a possible embodiment of the present disclosure, the DMRS transmission power may be the same power as an uplink data channel of the terminal on a same RE, and/or the DMRS transmission power corresponding to each DMRS port may be configured separately.

In a possible embodiment of the present disclosure, the DMRS scrambling information may include at least two DMRS scrambling IDs corresponding to the DMRSs.

In a possible embodiment of the present disclosure, the target DMRS may be multiplexed with the uplink data in a time-division manner, and the target DMRS may correspond to the DMRS configuration parameter and/or the DMRS scrambling information.

It should be appreciated that, according to the embodiments of the present disclosure, the terminal may select one of the at least two DMRS IDs configured by the network device. As a result, it is able to increase the quantity of DMRSs capable of being selected by the terminal, and increase the DMRS capacity to some extent, thereby to reduce the probability of a collision between reference signals transmitted in a non-orthogonal manner, and support a large quantity of terminals to perform the transmission simultaneously.

In order to improve the transmission validity, usually high-order modulation, e.g., 16QAM, 64QAM or 256QAM, is used. However, the high-order modulation is easily susceptible to a phase noise. In addition, the higher the modulation order, the more sensitive to the phase noise. Apart from this, a frequency offset of the terminal may lead to deterioration in the channel estimation performance. In order to eliminate the phase noise and compensate for an impact caused by the frequency offset, a transmitting end needs to transmit a reference signal known to a receiving end, e.g., a PTRS. However, there is currently no configuration mode for the PTRS in a non-orthogonal uplink transmission scenario in the related art.

Figure 7:
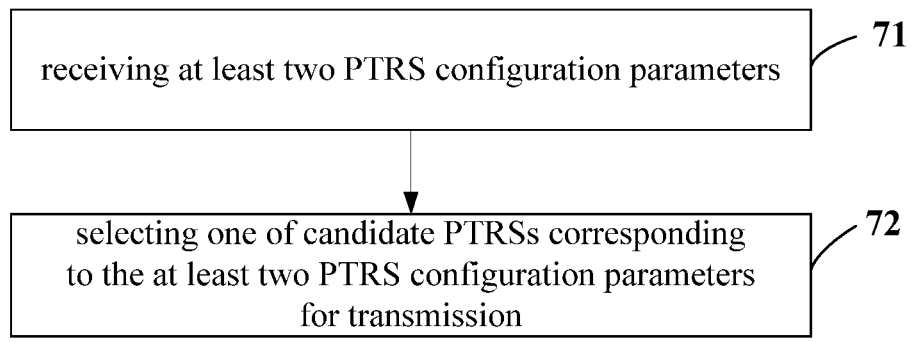
FIG. 7 is another flow chart of the information transmission method for the terminal side according to some embodiments of the present disclosure.

The present disclosure further provides in some embodiments an information transmission method for a terminal side which, as shown in FIG. 7, includes the following steps.

Step 71: receiving at least two PTRS configuration parameters.

Here, a terminal may receive the at least two PTRS configuration parameters configured by a network device.

Step 72: selecting one of candidate PTRSs corresponding to the at least two PTRS configuration parameters for transmission.

The terminal may select one of the at least two PTRS configuration parameters configured by the network device, and transmit the PTRS corresponding to the selected PTRS configuration parameter. In this regard, the receiving end may estimate the phase noise in accordance with the PTRS, and then perform the corresponding phase compensation. Usually, a frequency-domain density of the PTRS depends on a system bandwidth, e.g., one PTRS subcarrier may be inserted every one or more physical resource blocks (Physical Resource Blocks, PRBs). A time-domain density of the PTRS is associated with a modulation coding scheme (Modulation Coding Scheme, MCS) of a data symbol, e.g., one PTRS symbol may be inserted every one or two symbols.

To be specific, the PTRS configuration parameter may include at least one of the followings.

Index of a PTRS configuration. The indexes of the PTRS configurations may be used to differentiate the PTRS configurations from each other. Here, the index of the PTRS configuration may be a PTRS index maintained by the system. For example, when a PTRS pool of the system includes PTRS indices 1 to N and a PTRS index 3 has been configured by the network device for the terminal, the index of the PTRS configuration may be just 3. Alternatively, the index of the PTRS configuration may be an index of a PTRS configured by the network device for the terminal. For example, when the PTRS pool of the system includes PTRS indices 1 to N and PTRS indices 3, 4 and 5 have been configured by the network device for the terminal, the indexes of the PTRS configurations may be just 1, 2 and 3.

PTRS Port Index.

PTRS time/frequency-domain position, e.g., a time-domain symbol where the PTRS is located, or a subcarrier where the PTRS is located.

PTRS time/frequency-domain density, i.e., a time-domain density and/or a frequency-domain density of the PTRS.

Correspondence between PTRSs and preambles. Here, the correspondence may be indicated explicitly or implicitly. Taking the explicit indication as an example, a preamble sequence or a preamble index corresponding to the PTRS configuration may be directly indicated in the PTRS configuration parameter. Taking the implicit indication as an example, the preamble sequence or the preamble index corresponding to the PTRS configuration may be determined through a predefined association relation.

Correspondence between PTRSs and DMRSs. Similar to the modes for indicating the correspondence between the PTRSs and the preambles, the correspondence between the PTRSs and the DMRSs may also be indicated explicitly or implicitly. Taking the explicit indication as an example, an index of a DMRS configuration parameter corresponding to the PTRS configuration may be directly indicated in the PTRS configuration parameter. Taking the implicit indication as an example, the index of the DMRS configuration parameter corresponding to the PTRS configuration may be determined through a predefined association relation.

PTRS Transmission Power.

When the PTRS configuration parameter includes the correspondence between the PTRSs and the DMRSs, prior to Step 71, the method may further include: acquiring a transmission resource for a DMRS; and determining a target transmission resource for the PTRS in accordance with the transmission resource and the correspondence between the PTRSs and the DMRSs.

According to the information transmission method in the embodiments of the present disclosure, in a non-orthogonal uplink transmission scenario, the terminal may select one of the candidate PTRSs corresponding to the at least two PTRS configuration parameters configured by the network device for transmission. As a result, it is able to prevent the transmission performance from being adversely affected by the phase noise and the frequency offset in the non-orthogonal uplink transmission, thereby to improve the transmission performance.

The information transmission method in different scenarios has been described hereinabove, and the corresponding terminal will be further described hereinafter in conjunction with the drawings.

Figure 8:
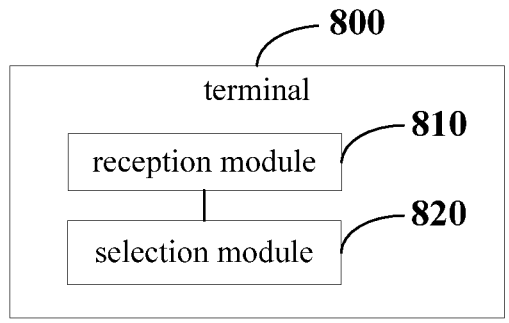
FIG. 8 is another schematic view showing the modular structure of the terminal according to some embodiments of the present disclosure.

As shown in FIG. 8, the present disclosure further provides in some embodiments a terminal 800 capable of implementing the above-mentioned method, i.e., receiving at least two PTRS configuration parameters and selecting one of candidate PTRSs corresponding to the at least two PTRS configuration parameters for transmission, with a same technical effect. The terminal 800 includes the following functional modules: a reception module 810 configured to receive at least two PTRS configuration parameters; and a selection module 820 configured to select one of candidate PTRSs corresponding to the at least two PTRS configuration parameters for transmission.

In a possible embodiment of the present disclosure, the PTRS configuration parameter may include at least one of an index of a PTRS configuration, a PTRS port index, a PTRS time/frequency-domain density, a correspondence between PTRSs and preambles, a correspondence between PTRSs and DMRSs, and PTRS transmission power.

In a possible embodiment of the present disclosure, when the PTRS configuration parameter includes the correspondence between the PTRSs and the DMRSs, the terminal 800 may further include: an acquisition module configured to acquire a transmission resource for a DMRS; and a determination module configured to determine a target transmission resource for the PTRS in accordance with the transmission resource and the correspondence between the PTRSs and the DMRSs.

According to some embodiments of the present disclosure, the terminal may select one of the candidate PTRSs corresponding to the at least two PTRS configuration parameters configured by the network device for transmission. As a result, it is able to prevent the transmission performance from being adversely affected by the phase noise and the frequency offset in the non-orthogonal uplink transmission, thereby to improve the transmission performance.

The information transmission method has been described hereinabove at the terminal side, and it will be further described at the network device side hereinafter in conjunction with the drawings.

Figure 9:
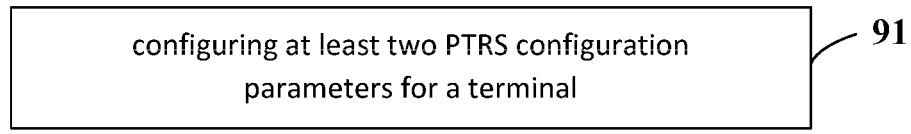
FIG. 9 is another flow chart of the information transmission method for the network device side according to some embodiments of the present disclosure.

As shown in FIG. 9, the present disclosure further provides in some embodiments an information transmission method for a network device, which includes Step 91 of configuring at least two PTRS configuration parameters for a terminal.

The terminal may select one of the at least two PTRS configuration parameters configured by the network device, and transmit a PTRS corresponding to the selected PTRS configuration parameter. In this regard, the receiving end may estimate a phase noise in accordance with the PTRS, and then perform the corresponding phase compensation. Usually, a frequency-domain density of the PTRS depends on a system bandwidth, e.g., one PTRS subcarrier may be inserted every one or more PRBs. A time-domain density of the PTRS is associated with an MCS of a data symbol, e.g., one PTRS symbol may be inserted every one or two symbols. It should be appreciated that, the method at the network device side may correspond to the above-mentioned method at the terminal side, and various implementation modes of the method at the terminal side may be applied to the method at the network device side.

In a possible embodiment of the present disclosure, the PTRS configuration parameter may include at least one of an index of a PTRS configuration, a PTRS port index, a PTRS time/frequency-domain density, a correspondence between PTRSs and preambles, a correspondence between PTRSs and DMRSs, and PTRS transmission power.

According to the information transmission method in the embodiments of the present disclosure, the network device may configure at least two PTRS configuration parameters for the terminal, and the terminal may select one of candidate PTRSs corresponding to the at least two PTRS configuration parameters configured by the network device for transmission. As a result, it is able to prevent the transmission performance from being adversely affected by the phase noise and the frequency offset in the non-orthogonal uplink transmission, thereby to improve the transmission performance.

The information transmission method in various scenarios has been described hereinabove, and the corresponding network device will be further described hereinafter in conjunction with the drawings.

Figure 10:
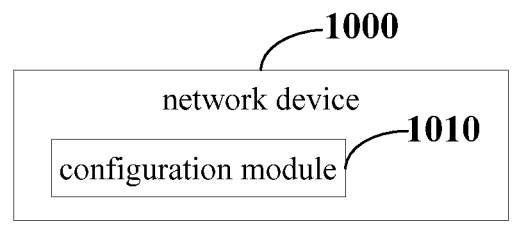
FIG. 10 is another schematic view showing the modular structure of the network device according to some embodiments of the present disclosure.

As shown in FIG. 10, the present disclosure further provides in some embodiments a network device 1000 capable of implementing the above-mentioned method, i.e., configuring at least two PTRS configuration parameters for a terminal, with a same technical effect. The network device 1000 includes the following functional module: a configuration module 1010 configured to configure at least two PTRS configuration parameters for a terminal. The PTRS configuration parameter may include at least one of an index of a PTRS configuration, a PTRS port index, a PTRS time/frequency-domain density, a correspondence between PTRSs and preambles, a correspondence between PTRSs and DMRSs, and PTRS transmission power.

It should be appreciated that, according to the embodiments of the present disclosure, the network device may configure at least two PTRS configuration parameters for the terminal, and the terminal may select one of candidate PTRSs corresponding to the at least two PTRS configuration parameters configured by the network device for transmission. As a result, it is able to prevent the transmission performance from being adversely affected by the phase noise and the frequency offset in the non-orthogonal uplink transmission, thereby to improve the transmission performance.

It should be further appreciated that, the above modules may be divided merely on the basis of their logic functions, and in actual use, they may be completely or partially integrated into a physical entity, or physically separated from each other. These modules may be implemented by calling software through a processing element, or implemented in the form of hardware. For example, the determination module may be a processing element arranged separately, or integrated into a chip of the above-mentioned device. In addition, the determination module may also be stored in the memory of the above-mentioned device in the form of a program code, and may be called and executed by a processing element of the above-mentioned device so as to achieve the above functions of the determination module. The other modules may be implemented in a similar manner.

All or parts of the modules may be integrated together or arranged separately. Here, the modules, units or assemblies may each of an integrated circuit having a signal processing capability. During the implementation, the steps of the method or the modules may be implemented through an integrated logic circuit of the processing element in the form of hardware or through instructions in the form of software.

For example, the above modules may be one or more integrated circuits capable of implementing the above-mentioned method, e.g., one or more application specific integrated circuits (Application Specific Integrated Circuits, ASICs), one or more digital signal processors (Digital Signal Processors, DSPs), or one or more field programmable gate arrays (Field Programmable Gate Arrays, FPGAs). For another example, when a certain module is implemented by calling a program code through a processing element, the processing element may be a general-purpose processor, e.g., a central processing unit (Central Processing Unit, CPU) or any other processor capable of calling the program code. These modules may be integrated together and implemented in the form of system-on-a-chip (SOC).

Figure 11:
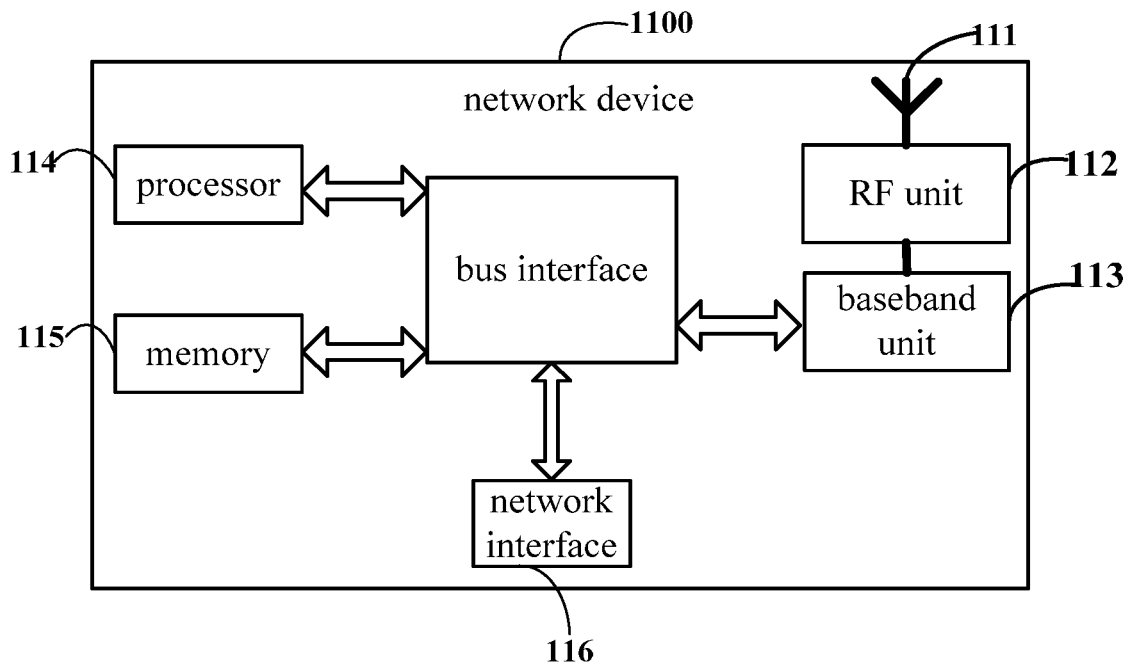
FIG. 11 is a block diagram of the network device according to some embodiments of the present disclosure.

To be specific, the present disclosure further provides in some embodiments a network device. As shown in FIG. 11, the network device 1100 includes an antenna 111, a radio frequency unit 112, and a baseband unit 113. The antenna 111 may be connected to the radio frequency unit 112. In an uplink direction, the radio frequency unit 112 is configured to receive information via the antenna 111, and transmit the received information to the baseband unit 113 for processing. In a downlink direction, the baseband unit 113 is configured to process to-be-transmitted information, and to transmit the processed information to the radio frequency unit 112. The radio frequency unit 112 is configured to process the received information and transmit the processed information via the antenna 111.

A frequency band processing unit may be located within the baseband unit 113, so that the above method for the network device may be implemented within the baseband unit 113. The baseband unit 113 may include a processor 114 and a memory 115.

The baseband unit 113 may, e.g., include at least one baseband board on which a plurality of chips is located, as shown in FIG. 11. One chip may be, e.g., the processor 114 connected to the memory 115 and configured to call a program stored in the memory 115 so as to perform operations for the network device in the above-mentioned method embodiments.

The baseband unit 113 may further include a network interface 116 configured to exchange information with the radio frequency unit 112. The network interface may be, e.g., a common public radio interface (Common Public Radio Interface, CPRI).

Here, the processor may include merely one processor, or a plurality of processing elements. For example, the processor may be a CPU, an ASIC, or one or more integrated circuits configured to implement the above-mentioned method for the network device, e.g., one or more DSPs, or one or more FPGAs. The memory may include merely one memory, or a plurality of storage elements.

The memory 115 may include a volatile memory, a nonvolatile memory or both. The nonvolatile memory may be a read-only memory (Read-Only Memory, ROM), a programmable ROM (Programmable ROM, PROM), an erasable PROM (Erasable PROM, EPROM), an electrically EPROM (Electrically EPROM, EEPROM) or a flash memory. The volatile memory may be a random access memory (Random Access Memory, RAM) which serves as an external high-speed cache. Illustratively but not restrictively, the RAM may include static RAM (Static RAM, SRAM), dynamic RAM (Dynamic RAM, DRAM), synchronous DRAM (Synchronous DRAM, SDRAM), double data rate SDRAM (Double Data Rate SDRAM, DDRSDRAM), enhanced SDRAM (Enhanced SDRAM, ESDRAM), synchronous link DRAM (Synchronous Link DRAM, SLDRAM) or direct Rambus RAM (Direct Rambus RAM, DRRAM). The memory 115 intends to include, but not limited to, the above-mentioned and any other appropriate memories.

To be specific, in some embodiments of the present disclosure, the network device may further include a computer program stored in the memory 115 and executed by the processor 114. The processor 114 is configured to call the computer program in the memory 115 so as to implement the method executed by the modules in FIG. 5 or FIG. 10.

To be specific, when the processor 114 calls the computer program in the memory 115 to implement the method executed by the modules in FIG. 6, it is able to achieve a same technical effect. The computer program is called by the processor 114 so as to: receive an uplink signal; and determine uplink data for a terminal in accordance with the target DMRS in the uplink signal. The terminal may correspond to at least two DMRS identities, and the target DMRS may be one of DMRSs indicated by the at least two DMRS identities.

To be specific, when the processor 114 calls the computer program in the memory 115 to implement the method executed by the modules in FIG. 8, it is able to achieve a same technical effect. The computer program is called by the processor 114 so as to configure at least two PTRS configuration parameters for a terminal.

The network device may be a base transceiver station (Base Transceiver Station, BTS) in a global system of mobile communication (Global System of Mobile communication, GSM) or code division multiple access (Code Division Multiple Access, CDMA) system, or a node B (Node B, NB) in a wideband code division multiple access (Wideband Code Division Multiple Access, WCDMA), or an evolutional node B (Evolutional Node B, eNB or eNodeB) in an LTE, or a relay or an access point, or a base station in a future 5G network, which will not be particularly defined herein.

Figure 12:
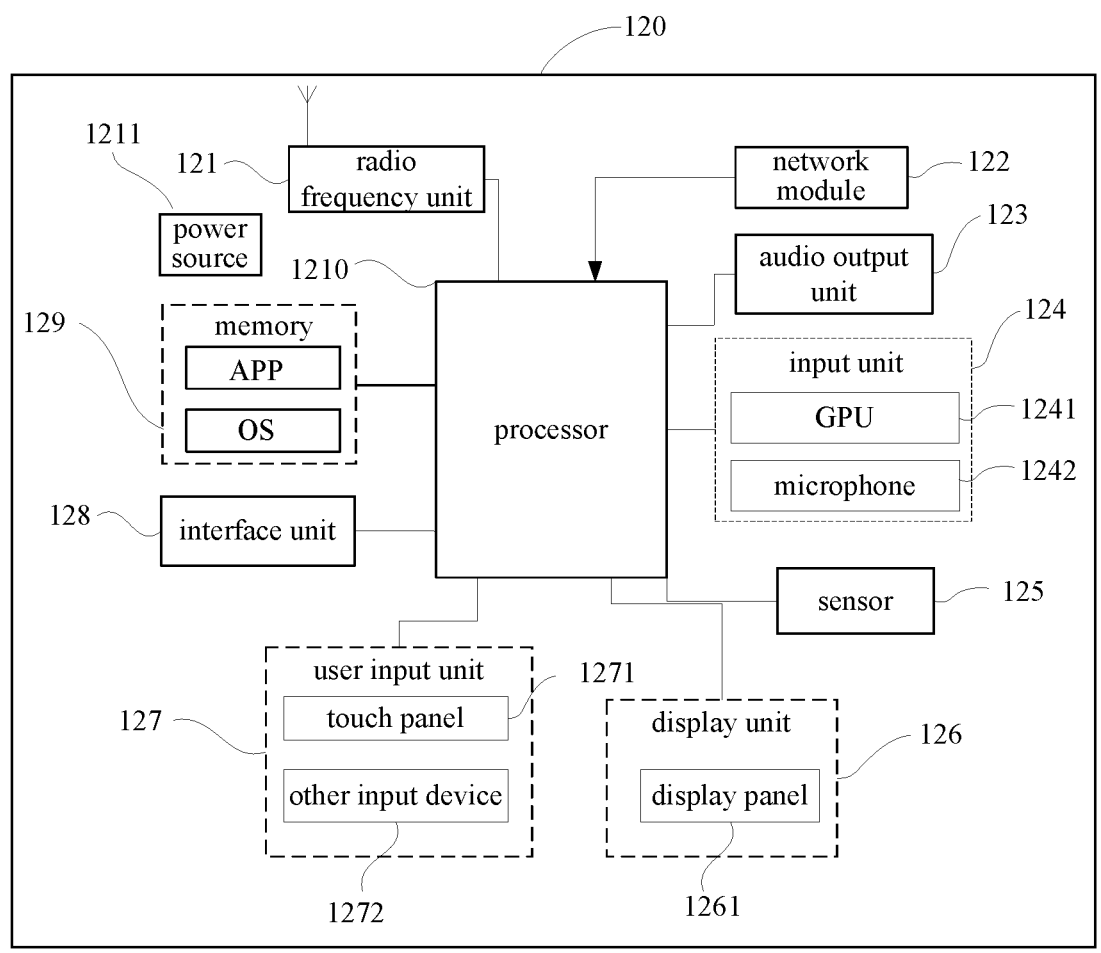
FIG. 12 is a block diagram of the terminal according to some embodiments of the present disclosure.

In order to achieve the above-mentioned purpose in a better manner, FIG. 12 shows a hardware structure of a terminal. The terminal 120 may include, but not limited to, a radio frequency unit 121, a network module 122, an audio output unit 123, an input unit 124, a sensor 125, a display unit 126, a user input unit 127, an interface unit 128, a memory 129, a processor 1210, and a power source 1211. It should be appreciated that, the structure in FIG. 12 shall not be construed as limiting the terminal. The terminal may include more or fewer members, or some members may be combined, or the components may be arranged in different modes. In the embodiments of the present disclosure, the terminal may include, but not limited to, mobile phone, tablet computer, laptop computer, personal digital assistant (Personal Digital Assistant, PDA), vehicle-mounted terminal, wearable device or pedometer.

The radio frequency unit 121 is configured to receive an uplink signal, and the processor 1210 is configured to determine uplink data for a terminal in accordance with the target DMRS in the uplink signal. The terminal may correspond to at least two DMRS identities, and the target DMRS may be one of DMRSs indicated by the at least two DMRS identities.

Alternatively, the radio frequency unit 121 is configured to receive at least two DMRS identities, and the processor 1210 is configured to transmit uplink data on an MA resource using a target DMRS. The target DMRS may be one of DMRSs indicated by the at least two DMRS identities.

It should be appreciated that, in the embodiments of the present disclosure, the radio frequency unit 121 is configured to transmit and receive signals during the information transmission or phone call. To be specific, the radio frequency unit 121 may, upon the receipt of downlink data from a base station, transmit the downlink data to the processor 1210 for subsequent treatment. In addition, the radio frequency unit 121 may transmit uplink data to the base station. Usually, the radio frequency unit 121 may include, but not limited to, an antenna, at least one amplifier, a transceiver, a coupler, a low-noise amplifier and a duplexer. In addition, the radio frequency unit 121 may communicate with a network and the other devices via a wireless communications system.

The network module 122 is configured to enable a user to access the broadband Internet in a wireless manner, e.g., help the user to receive and send an e-mail, browse a web or access a streaming media.

The audio output unit 123 is configured to convert audio data received by the radio frequency unit 121 or the network module 122, or audio data stored in the memory 129, into an audio signal and output the audio signal as a sound. In addition, the audio output unit 123 is further configured to provide an audio output related to a specific function executed by the terminal 120 (e.g., a sound occurring when a calling signal or a message has been received). The audio output unit 123 may include a loudspeaker, a buzzer and a receiver.

The input unit 124 is configured to receive an audio or video signal. It may include a graphics processing unit (Graphics Processing Unit, GPU) 1241 and a microphone 1242. The GPU 1241 is configured to process image data of a static image or video acquired by an image collection unit (e.g., a camera) in a video capturing mode or an image capturing mode, and a processed image frame may be displayed by the display unit 126. The image frame processed by the GPU 1241 may be stored in the memory 129 (or any other storage medium) or transmitted via the radio frequency unit 121 or network module 122. The microphone 1242 is configured to receive a sound, and convert the sound into voice data. In a call mode, the processed audio data may be converted into data in a format capable of being transmitted by the radio frequency unit 121 to a mobile communication base station.

The at least one sensor 125 may include a light sensor, a movement sensor and the other sensors. To be specific, the light sensor may include an ambient light sensor or a proximity sensor. The ambient light sensor is configured to adjust a brightness value of a display panel 1261 in accordance with ambient light. The proximity sensor is configured to turn off the display panel 1261 and/or a backlight source. As one of the movement sensors, an accelerometer may detect acceleration in various directions (usually a three-axis accelerometer), and detect a level and a direction of a gravity force when in a static state. Through the accelerometer, it is able to identify a posture of the electronic device (e.g., perform a switching operation between portrait and landscape orientations, play relevant games, and calibrate a posture of a magnetometer), and perform vibration-related functions (e.g., count steps and strikes). The sensor 125 may further include a fingerprint sensor, a pressure sensor, an iris sensor, a molecule sensor, a gyroscope, a barometer, a hygrometer, a thermometer or an infrared sensor, which will not be particularly defined herein.

The display unit 126 is configured to display information inputted by the user or provided to the user. The display unit 126 may include the display panel 1261, e.g., a liquid crystal display (Liquid Crystal Display, LCD) panel, or an organic light-emitting diode (Organic Light-Emitting Diode, OLED) panel.

The user input unit 127 is configured to receive digital or character information inputted by the user, and generate a key signal input related to user settings and function control of the terminal. To be specific, the user input unit 127 may include a touch panel 1271 and an input device 1272. The touch panel 1271, also called as touch screen, is configured to collect a touch operation made by the user on or in proximity to the touch panel (e.g., an operation made by the user through any appropriate object or attachment (e.g., finger or stylus) on or in the proximity to the touch panel 1271). The touch panel 1271 may include a touch detection unit and a touch controller. The touch detection unit is configured to detect a touch position and a signal generated due to the touch operation, and to transmit the signal to the touch controller. The touch controller is configured to receive touch information from the touch detection unit, convert it into coordinates of a touch point, transmit the coordinates to the processor 1210, and receive and execute a command from the processor 1210. In addition, the touch panel 1271 may be of a resistive type, a capacitive type, an infrared type or a surface acoustic wave type. The other input device 1272 may include, but not limited to, a physical keyboard, a functional button (e.g., a volume control button or an on/off button), a trackball, a mouse, and a joystick, which will not be particularly defined herein.

Further, the touch panel 1271 may cover the display panel 1261. When the touch operation made on or in proximity to the touch panel 1271 has been detected, the touch panel 1271 may transmit the touch information to the processor 1210, so as to determine a type of a touch event. Then, the processor 1210 may control the display panel 1261 to provide a corresponding visual output in accordance with the type of the touch event. Although the touch panel 1271 and the display panel 1261 are configured as two separate members in FIG. 12, in some embodiments of the present disclosure, they may be integrated so as to achieve the input and output functions of the electronic device, which will not be particularly defined herein.

The interface unit 128 is configured to provide an interface between an external device and the terminal 120. For example, the external device may include a wired or wireless headset port, an external power source port (or a charging port), a wired or wireless data port, a memory card port, a port for a device having an identification module, an audio input/output (I/O) port, a video I/O port, and an earphone port. The interface unit 128 is configured to receive an input from the external device (e.g., data information and electricity) and transmit the input to one or more elements of the terminal 120, or transmit data between the terminal 120 and the external device.

The memory 129 is configured to store therein a software application and various data. It may mainly include an application storage area and a data storage area. An operating system and at least one application for the functions (e.g., an audio/image playing function) may be stored in the application storage area. Data created in accordance with the operation of the mobile phone (e.g., audio data and textbook) may be stored in the data storage area. In addition, the memory 129 may include a high-speed random access memory, or a non-volatile memory (e.g., at least one magnetic disk or flash memory), or any other volatile solid state memory.

As a control center of the terminal, the processor 1210 may be connected to the other members of the terminal via various interfaces and circuits, and configured to run or execute the software program and/or module stored in the memory 129, and call the data stored in the memory 129, so as to execute the functions of the terminal and process the data, thereby to monitor the entire terminal. The processor 1410 may include one or more processing units. In a possible embodiment of the present disclosure, an application processor and a modem may be integrated into the processor 1210. The application processor is mainly configured to process the operating system, a user interface and the application. The modem is mainly configured to process wireless communication. It should be appreciated that, the modem may also not be integrated into the processor 1210.

The power source 1211 (e.g., a battery) is configured to supply power to the members of the terminal 120. In a possible embodiment of the present disclosure, the power source 1211 is logically connected to the processor 1210 via a power source management system, so as to achieve such functions as charging, discharging and power consumption management through the power source management system.

In addition, the terminal 120 may include some functional modules not shown in FIG. 12, which will not be particularly defined herein.

The present disclosure further provides in some embodiments a terminal, which includes a processor 1210, a memory 129, and a computer program stored in the memory 129 and executed by the processor 1210. The computer program is executed by the processor 1210 so as to implement the procedures of the above-mentioned information transmission method with a same technical effect, which will not be particularly defined herein. The terminal may be a wireless terminal or a wired terminal. The wireless terminal may be a device capable of providing voice data and/or any other service data to a user, e.g., a handheld device having a wireless connection function, or any other processing device capable of being connected to a wireless modem. The wireless terminal may communicate with one or more core networks via a radio access network (Radio Access Network, RAN). The wireless terminal may be a mobile terminal, e.g., a mobile phone (or cellular phone), or a computer having the mobile terminal, e.g., a portable, pocket-sized, handheld, built-in or vehicle-mounted mobile device, which are capable of exchanging voice and/or data with the RAN. For example, the wireless terminal may be a personal communication service (Personal Communication Service, PCS) telephone, a cordless telephone, a session initiation protocol (Session Initiation Protocol, SIP) phone, a wireless local loop (Wireless Local Loop, WLL) station, or a personal digital assistant (Personal Digital Assistant, PDA). In addition, the wireless terminal may also be called as system, subscriber unit, subscriber station, mobile station, mobile, remote station, remote terminal, access terminal, user terminal, user agent or user device, which will not be particularly defined herein.

The present disclosure further provides in some embodiments a computer-readable storage medium storing therein a computer program. The computer program is executed by a processor so as to implement the procedures of the above-mentioned information transmission method with a same technical effect, which will not be particularly defined herein. The computer-readable storage medium may be, e.g., a read-only memory (Read-Only Memory, ROM), a random access memory (Random Access Memory, RAM), a magnetic disk or an optical disk.

It should be appreciated that, units and steps described in the embodiments of the present disclosure may be implemented in the form of electronic hardware, or a combination of a computer program and the electronic hardware. Whether or not these functions are executed by hardware or software depends on specific applications or design constraints of the technical solution. Different methods may be adopted with respect to the specific applications so as to achieve the described functions, without departing from the scope of the present disclosure.

It should be further appreciated that, for convenience and clarification, operation procedures of the system, device and units described hereinabove may refer to the corresponding procedures in the method embodiment, and thus will not be particularly defined herein.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

The units may be, or may not be, physically separated from each other. The units for displaying may be, or may not be, physical units, i.e., they may be arranged at an identical position, or distributed on a plurality of network elements. Parts or all of the units may be selected in accordance with the practical need, so as to achieve the purpose of the present disclosure.

In addition, the functional units in the embodiments of the present disclosure may be integrated into a processing unit, or the functional units may exist independently, or two or more functional units may be combined together.

In the case that the functional units are implemented in a software form and sold or used as a separate product, they may be stored in a computer-readable medium. Based on this, the technical solutions of the present disclosure, partial or full, or parts of the technical solutions of the present disclosure contributing to the related art, may appear in the form of software products, which may be stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus flash disk, a mobile hard disk, an ROM, an RAM, a magnetic disk or an optical disk.

It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. Of course, some steps may also be performed in parallel, or independently of each other.

It should be further appreciated that, after reading the descriptions of the present disclosure, it is able for a person skilled in the art, using a basic programming skill, to implement any or all steps of the method and any or all members of the device in any computing device (including a processor and a storage medium) or a network consisting of the computing devices, in the form of hardware, firmware, software or a combination thereof.

Hence, the purposes of the present disclosure may also be implemented by one program or a set of programs running on any computing device, e.g., a known general-purpose computer, or implemented merely by a program product including programs codes capable of implementing the method or device. In other words, this program product and a storage medium storing therein the program product also constitute a part of the present disclosure. Obviously, the storage medium may be any known storage medium or a storage medium that may occur in future. It should be further appreciated that, according to the device and the method in the embodiments of the present disclosure, the members and/or steps may be subdivided and/or recombined, which shall also be deemed as equivalents of the present disclosure. In addition, the steps for executing the above-mentioned processings may be performed in a chronological order. Of course, some steps may also be performed in parallel, or independently of each other.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

The invention claimed is:

1. An information transmission method performed by a terminal, the information transmission method comprising:
receiving at least two Demodulation Reference Signal (DMRS) identities; and
transmitting uplink data on a Multiple Access (MA) resource using a target DMRS, the target DMRS being one of DMRSs indicated by the at least two DMRS identities,
wherein the DMRS identity comprises DMRS scrambling information; and
wherein the DMRS scrambling information comprises at least two DMRS scrambling IDs corresponding to the DMRSs.

2. The information transmission method according to claim 1, wherein the DMRS identity further comprises a DMRS configuration parameter.

3. The information transmission method according to claim 2, wherein the DMRS configuration parameter comprises at least one of an index of a DMRS configuration, a DMRS port index, a DMRS time-domain position, a correspondence between DMRSs and preambles, a correspondence between DMRSs and Phase Tracking Reference Signals (PTRSs), a DMRS bandwidth, or DMRS transmission power.

4. The information transmission method according to claim 3, wherein the DMRS bandwidth is predefined or configured by the network device, and the DMRS bandwidth is greater than or equal to a bandwidth for the MA resource.

5. The information transmission method according to claim 3, wherein the DMRS transmission power is the same power as an uplink data channel of the terminal on a same Resource Element (RE), and/or the DMRS transmission power corresponding to each DMRS port is configured separately.

6. The information transmission method according to claim 2, wherein the target DMRS is multiplexed with the uplink data in a time-division manner, and the target DMRS corresponds to the DMRS configuration parameter and/or the DMRS scrambling information.

7. A terminal, comprising a processor, a memory, and a computer program stored in the memory and executed by the processor, wherein the processor is configured to execute the computer program so as to implement an information transmission method performed by the terminal, the information transmission method comprising:
   receiving at least two Demodulation Reference Signal (DMRS) identities; and
   transmitting uplink data on a Multiple Access (MA) resource using a target DMRS, the target DMRS being one of DMRSs indicated by the at least two DMRS identities,
   wherein the DMRS identity comprises DMRS scrambling information; and
   wherein the DMRS scrambling information comprises at least two DMRS scrambling IDs corresponding to the DMRSs.

8. The terminal according to claim 7, wherein the DMRS identity further comprises a DMRS configuration parameter.

9. The terminal according to claim 8, wherein the DMRS configuration parameter comprises at least one of an index of a DMRS configuration, a DMRS port index, a DMRS time-domain position, a correspondence between DMRSs and preambles, a correspondence between DMRSs and Phase Tracking Reference Signals (PTRSs), a DMRS bandwidth, or DMRS transmission power.

10. The terminal according to claim 9, wherein the DMRS bandwidth is predefined or configured by the network device, and the DMRS bandwidth is greater than or equal to a bandwidth for the MA resource.

11. The terminal according to claim 9, wherein the DMRS transmission power is the same power as an uplink data channel of the terminal on a same Resource Element (RE), and/or the DMRS transmission power corresponding to each DMRS port is configured separately.

12. A network device, comprising a processor, a memory, and a computer program stored in the memory and executed by the processor, wherein the processor is configured to execute the computer program so as to implement an information transmission method performed by the network device, the information transmission method comprising:
   receiving an uplink signal, the uplink signal comprising a target Demodulation Reference Signal (DMRS); and
   determining uplink data for a terminal in accordance with the target DMRS,
   wherein the terminal corresponds to at least two DMRS identities, and the target DMRS is one of DMRSs indicated by the at least two DMRS identities,
   wherein the DMRS identity comprises DMRS scrambling information; and
   wherein the DMRS scrambling information comprises at least two DMRS scrambling IDs corresponding to the DMRSs.

13. The network device according to claim 12, wherein prior to receiving the uplink signal, the information transmission method further comprises configuring the at least two DMRS identities for the terminal.

14. The network device according to claim 12, wherein the DMRS identity further comprises a DMRS configuration parameter.

15. The network device according to claim 14, wherein the DMRS configuration parameter comprises at least one of an index of a DMRS configuration, a DMRS port index, a DMRS time-domain position, a correspondence between DMRSs and preambles, a correspondence between DMRSs and Phase Tracking Reference Signals (PTRSs), a DMRS bandwidth, or DMRS transmission power,
   wherein the DMRS bandwidth is predefined or configured by the network device, and the DMRS bandwidth is greater than or equal to a bandwidth for a Multiple Access (MA) resource where the uplink data is located,
   wherein the DMRS transmission power is the same power as an uplink data channel of the terminal on a same Resource Element (RE), and/or the DMRS transmission power corresponding to each DMRS port is configured separately.

16. The network device according to claim 14, wherein the target DMRS is multiplexed with the uplink data in a time-division manner, and the target DMRS corresponds to the DMRS configuration parameter and/or the DMRS scrambling information.

17. The network device according to claim 14, wherein prior to receiving the uplink signal, the information transmission method further comprises configuring a PTRS configuration parameter for the terminal.

18. A non-transitory computer-readable storage medium storing therein a computer program, wherein the non-transitory computer program is executed by a processor so as to implement the steps in the information transmission method according to claim 1.

19. The terminal according to claim 8, wherein the target DMRS is multiplexed with the uplink data in a time-division manner, and the target DMRS corresponds to the DMRS configuration parameter and/or the DMRS scrambling information.

20. The network device according to claim 14, wherein one PTRS configuration parameter corresponds to one DMRS identity, or
   wherein the PTRS configuration parameter comprises at least one of an index of a PTRS configuration, a PTRS port index, a PTRS time/frequency-domain position, a PTRS time/frequency-domain density, a correspondence between PTRSs and preambles, a correspondence between PTRSs and DMRSs, and PTRS transmission power.

* * * * *